US012561322B2

(12) United States Patent
Ganesan et al.

(10) Patent No.: US 12,561,322 B2
(45) Date of Patent: Feb. 24, 2026

(54) SYSTEMS AND METHODS FOR SEMANTIC CACHING

(71) Applicant: ServiceNow, Inc., Santa Clara, CA (US)

(72) Inventors: Ashok Ganesan, Leander, TX (US); Peng Wang, Bellevue, WA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 18/742,043

(22) Filed: Jun. 13, 2024

(65) Prior Publication Data

US 2025/0384036 A1      Dec. 18, 2025

(51) Int. Cl.
| | |
|---|---|
| *G06F 16/20* | (2019.01) |
| *G06F 16/2453* | (2019.01) |
| *G06F 16/248* | (2019.01) |
| G06F 16/334 | (2025.01) |

(52) U.S. Cl.
CPC ...... G06F 16/24539 (2019.01); G06F 16/248 (2019.01); *G06F 16/3347* (2019.01)

(58) Field of Classification Search
CPC ............. G06F 16/24539; G06F 16/248; G06F 16/3347
See application file for complete search history.

(56) References Cited

U.S. PATENT DOCUMENTS

| | | | | |
|---|---|---|---|---|
| 11,816,121 | B2 * | 11/2023 | Ng | G06F 16/248 |
| 2020/0320153 | A1 * | 10/2020 | Luz Xavier Da Costa | |
| | | | | G06N 20/00 |
| 2020/0409945 | A1 * | 12/2020 | Chen | G06F 16/24578 |
| 2023/0051025 | A1 * | 2/2023 | Pan | G06F 40/166 |
| 2023/0195735 | A1 * | 6/2023 | Al-Qurishi | G06F 16/2255 |
| | | | | 707/728 |
| 2023/0259705 | A1 | 8/2023 | Tunstall-Pedoe et al. | |
| 2024/0411737 | A1 * | 12/2024 | Sivaraj | G06F 16/2462 |

OTHER PUBLICATIONS

Zilliz, "Caching LLM Queries forperformance & cost improvements," Medium, Nov. 17, 2023, accessed on Feb. 15, 2024 via https://medium.com/@zilliz_learn/caching-llm-queries-for-performance-cost-improvements-52346fade9cd#:~:text=Are.

(Continued)

*Primary Examiner* — Diedra McQuitery
(74) *Attorney, Agent, or Firm* — FLETCHER YODER PC

(57) ABSTRACT

Systems and methods are provided to improve data retrieval from a cache memory by using semantic matching to retrieve data from the cache memory. The system includes a two-tiered cache system, with a first tier implementing "key-value" pairs, and a second tier that includes a table that is configured as an artificial intelligence (AI) search indexed source. When a new input does not have a matching "key" at the first tier, the system performs a semantic search at the second tier of the cache to determine if relevant data is stored in the cache. The current systems and methods increase the likelihood of obtaining data for queries from the cache memory, reduce the response time to the queries, improve search consistency, reduce computing resource utilization, improve system performance, and reduce costs.

20 Claims, 9 Drawing Sheets

(56)                References Cited

OTHER PUBLICATIONS

Ferrarotti Flavio et al.; "A Last-Resort Semantic Cache for Web Queries"; Aug. 25, 2009, SAT 2015 18th International Conference; Sep. 24-27, 2015; pp. 310-321 (XP047380356).

Heloir Yan Han; "Maximizing AI Efficiency in Production with Cacheing: a Cost-Efficient Performance Booster"; Mar. 19, 2024 (XP093306771) [retrieved from the internet—https://medium.com/data-science/maximizing-ai-efficiency-in-production-with-caching-a-cost-efficient-performance-booster-9b8afd200efd].

Fu Bang; "GPTCache: an Open-Source Semantic Cache for LLM Applications Enabling Faster Answers and Cost Savings", Oct. 24, 2023; pp. 1-7; (XP093256823) [retried from the Internet—https://openreview.net/pdf?id=ivwM8NwM4z—retrieved Aug. 20, 2025].

Shankar Arun; Implementing Semantic Caching: a Step-by-Step Guide to Faster, Cost-eEffective GenAI Workflows; Jun. 13, 2024 (XP093306769) [retrieved from the internet—https://medium.com/google-cloud/implementing-semantic-caching-a-step-by-step-guide-to-faster-cost-effective-genai-workflows-ef85d8e72883].

\* cited by examiner

SYSTEMS AND METHODS FOR SEMANTIC CACHING

TECHNICAL FIELD

The present disclosure relates generally to using caches to improve search performance, and more specifically, to using semantic caching to improve search performance.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations and these resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

Such a cloud computing service may host a virtual agent, such as a chat agent, that is designed to automatically respond to issues with the client instance based on natural language requests from a user of the client instance. For example, a user may provide a request to a virtual agent for assistance with an issue, wherein the virtual agent is part of a Natural Language Processing (NLP) or Natural Language Understanding (NLU) system. NLP is a general area of computer science and AI that involves some form of processing of natural language input. Examples of areas addressed by NLP include language translation, speech generation, parse tree extraction, part-of-speech identification, and others. NLU is a sub-area of NLP that specifically focuses on understanding user utterances. Examples of areas addressed by NLU include question-answering (e.g., reading comprehension questions), article summarization, and others. For example, a NLU may use algorithms to reduce human language (e.g., spoken or written) into a set of known symbols for consumption by a downstream virtual agent. NLP is generally used to interpret free text for further analysis. Current approaches to NLP are typically based on deep learning, which is a type of AI that examines and uses patterns in data to improve the understanding of a program. The virtual agent may then query a database (e.g., via a large language model (LLM)) based on the processed natural language input.

The virtual agent may store queried data in a cache so that future requests for that queried data may be processed by retrieving the queried data from the cache, rather than querying the database (e.g., via a large language model (LLM)). Cache memory is a memory that allows for quick retrieval of data. However, cache memory generally has limited storage size and is computationally expensive, which limits the data that may be stored in the cache. To optimize the benefits provided by the cache memory, caches are generally used to store relevant data and/or frequently requested data. For example, applications may store recent and/or frequently accessed data in a cache so that future requests for that data can be processed quickly. Further, the cache may be updated periodically to remove stale data (e.g., data that may be no longer relevant) and add new data.

Caching may reduce computing resource utilization, improve performance, and reduce costs associated with responding to queries. The data stored in a cache are typically "key-value" pairs, such that the "key" is a unique lookup entity for which a single "value" is stored. A cache hit occurs when the "key" is found in the cache, while a cache miss occurs when the "key" is not found in the cache. A given input returns the same cache key (i.e., the "key" of the "key-value" pair stored in the cache) and results in the same cached value (i.e., the "value" of the "key-value" pair stored in the cache). However, when the input is user generated, such as a plaintext query or request, the key-value method may be less applicable as the inputs are less likely to be an exact match (and thus have different keys). In turn, two inputs that have the same meaning but differ slightly (e.g., different order of words, different choice of words, etc.) may result in a cache miss, causing an unnecessary execution of a query/retrieval of the requested data (despite the requested data already being stored in the cache). By querying the database (as opposed to retrieving data from the cache memory), the data retrieval is slower and the system wastes excessive computational resources (e.g., a large language model (LLM) may be used to execute the query).

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Current techniques for caching data include implementing key-value pairs for data stored in a cache memory. For example, when executing a first query, the data retrieved for the first query may be stored in a cache along with a corresponding cache key. However, if a second query is slightly different (e.g., different order of words, different choice of words, etc.) than the first query, even if the meaning is the same, the second query may correspond to a different cache key. Thus, when searching the cache for relevant data, a cache miss may occur as the cache key of the second query is different than the cache key of the first query. This may be especially problematic for user generated inputs, such as plaintext queries. For example, different users may use different choice of words or different order of words for the queries, and even for the same user, different queries may be used for the same query purpose. For example, a first query of "what day is it" may have a first cache key, and a second query of "what day is it today" may have a second cache key. The data retrieved for the first query may be stored in the cache corresponding to the first cache key. In this example, when receiving the second query, a cache miss may occur as the first cache key associated with the data is not an exact match to the second cache key. Thus, the system may then execute the second query to retrieve the data even though the relevant data is already stored in the cache memory, which may cause slower data retrieval and/or waste of excessive computational resources.

Implementations herein are directed to systems and methods to improve data retrieval from a cache memory by using semantic matching to retrieve data from the cache memory. In some implementations, the system includes a two-tiered cache system, with a first tier implementing key-value pairs and a second tier including a table that is configured as an artificial intelligence (AI) search indexed source. In these implementations, when a new input does not have a key match at the first tier, the system may perform a semantic search at the second tier of the cache to determine if relevant data is stored in the cache. In turn, the current disclosure increases the likelihood of obtaining data from the cache memory as it does not require an exact match of an input to successfully identify an entry in the cache.

By leveraging semantic matching, the system of the current disclosure is more likely to retrieve data from a cache memory, thereby providing search results faster and expending fewer computing resources. For example, when receiving a user generated input, such as a query, the system may first search for a matching key corresponding to the query in the cache. If a matching key is not found, the system may then perform a semantic search by doing a "semantic matching" of the existing cached keys and retrieving the cached value if a key in the cache is similar to the key of the query. This improves the caching performance for a search application. The cache may include two levels: the first-level cache only yields a result when the search query is an exact match for a key in the cache; the second-level cache uses a semantic search to compare the meaning of the search query with those of the keys stored in the cache and outputs the cached values of the keys having similar meanings.

In an embodiment a method includes receiving a query and determining that the query does not match any record of a first plurality of records. In response to determining that the query does not match any record of the first plurality of records, a semantic value of the query is determined and, within a second plurality of records, a particular record is identified comprising a particular query term corresponding to a particular semantic value that matches the semantic value of the query within an error threshold.

In another embodiment, a system includes processing circuitry and memory, accessible by the processing circuitry. The memory stores instructions that, when executed by the processing circuitry, cause the processing circuitry to perform operations including receiving a query and determining that the query does not match any record of a first plurality of records. In response to determining that the query does not match any record of the first plurality of records, the operations include determining a semantic value of the query and identifying, within a second plurality of records, a particular record comprising a particular query term corresponding to a particular semantic value that matches the semantic value of the query within an error threshold.

In a further embodiment, a tangible, non-transitory computer readable storage media storing instructions that, when executed by processing circuitry, cause the processing circuitry to perform operations including receiving a query and determining that the query does not match any record of a first plurality of records. In response to determining that the query does not match any record of the first plurality of records, the operations include determining a semantic value of the query and identifying, within a second plurality of records, a particular record comprising a particular query term corresponding to a particular semantic value that matches the semantic value of the query within an error threshold.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
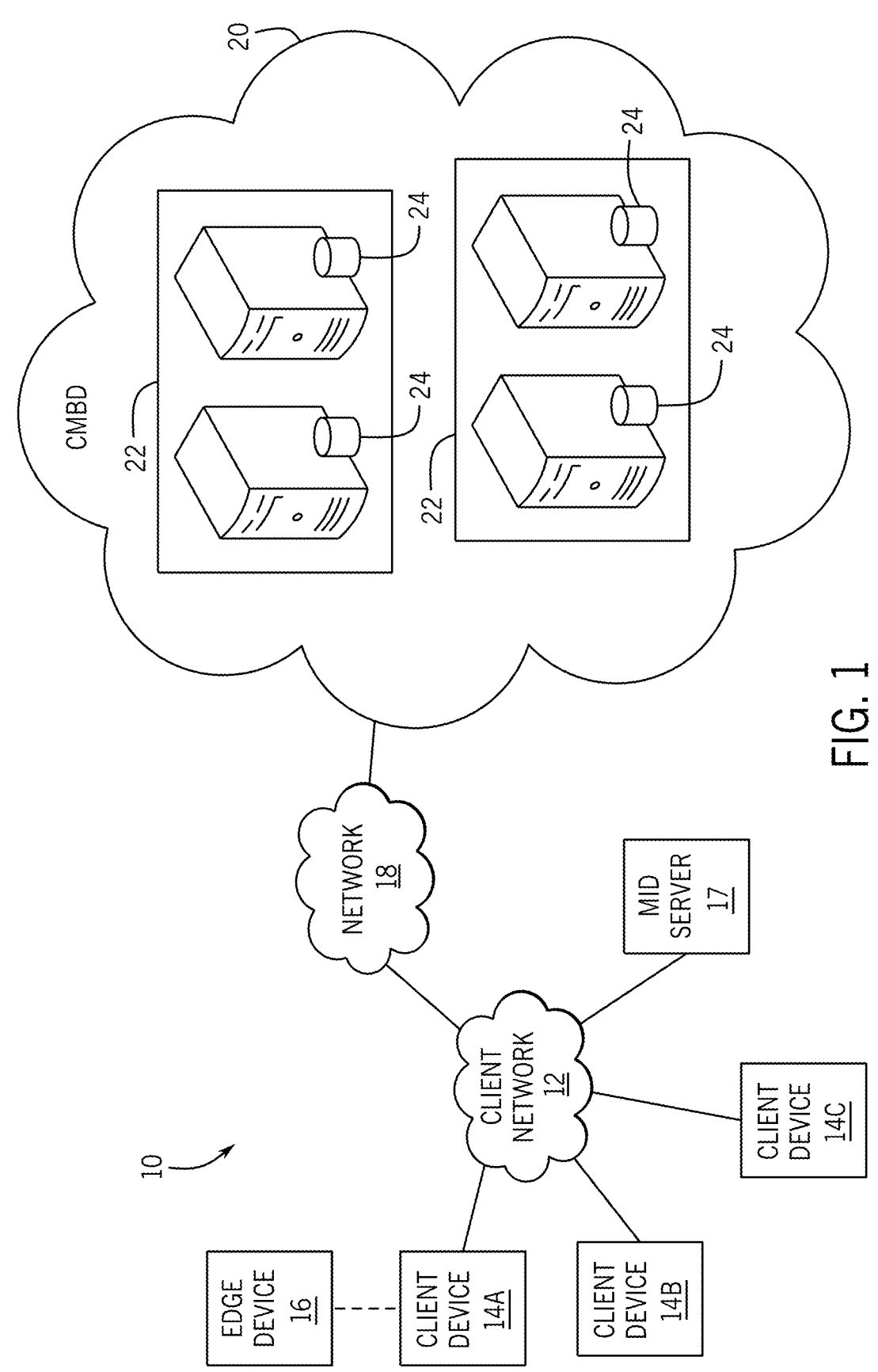
FIG. 1 is a block diagram of an embodiment of a cloud computing system in which embodiments of the present technique may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the terms "application", "engine", "program", or "plugin" refers to one or more sets of computer software instructions (e.g., computer programs and/or scripts) executable by one or more processors of a computing system to provide particular functionality. Computer software instructions as discussed herein can be written in any suitable programming languages, such as C, C++, C#, Pascal, Fortran, Perl, MATLAB, SAS, SPSS, JavaScript, AJAX, and JAVA. Such computer software instructions can comprise an independent application with data input and data display modules. Alternatively, the disclosed computer software instructions can be classes that are instantiated as distributed objects. The disclosed computer software instructions can also be component software, for example JAVABEANS or ENTERPRISE JAVABEANS. Additionally, the disclosed applications or engines can be implemented in computer software, computer hardware, or a combination thereof.

As used herein, the term "framework" refers to a system of applications and/or engines, as well as any other supporting data structures, libraries, modules, and any other supporting functionality, that cooperate to perform one or more overall functions. In particular, a "natural language understanding framework" or "NLU framework" comprises a collection of computer programs designed to process and derive meaning (e.g., intents, entities) from natural language utterances using one or more machine-learning (ML) components and one or more rule-based components. As used herein, a "behavior engine" or "BE," also known as a reasoning agent or RA/BE, refers to a rule-based agent, such as a virtual agent, designed to interact with users based on a conversation model. For example, a "virtual agent" may refer to a particular example of a BE that is designed to interact with users via natural language requests in a particular conversational or communication channel. With this in mind, the terms "virtual agent" and "BE" are used interchangeably herein. By way of specific examples, a virtual agent may be or include a chat agent that interacts with users via natural language requests and responses in a chat room environment, or that provides recommended answers to requests or queries made in a search text box. Other examples of virtual agents may include an email agent, a forum agent, a ticketing agent, a telephone call agent, a search agent, a genius search result agent, and so forth, which interact with users in the context of email, forum posts, search queries, autoreplies to service tickets, phone calls, and so forth.

As used herein, an "intent" refers to a desire or goal of a user which may relate to an underlying purpose of a communication, such as an utterance. As used herein, an "entity" refers to an object, subject, or some other parameterization of an intent. It is noted that, for present embodiments, certain entities are treated as parameters of a corresponding intent within an intent/entity model. More specifically, certain entities (e.g., time and location) may be globally recognized and extracted for all intents, while other entities are intent-specific (e.g., merchandise entities associated with purchase intents) and are generally extracted only when found within the intents that define them. As used herein, an "intent/entity model" (also referred to herein as an "intent-entity model") refers to a model that associates particular intents with particular entities and particular sample utterances, wherein entities associated with the intent may be encoded as a parameter of the intent within the sample utterances of the model. As used herein, an "understanding model" or "NLU model" is a collection of models and parameters used by the NLU framework to infer meaning of natural language utterances. An understanding model may include a search space with meaning representations (e.g., utterance trees) compiled from sample utterances of various intents indicated in an intent/entity model, a word vector distribution model that associates certain tokens (e.g., words or phrases) with particular word vectors, an intent/entity model, an intent model, an entity model, a taxonomy model, other models, or a combination thereof.

As used herein, the term "agents" may refer to computer-generated personas (e.g. chat agents or other virtual agents) that interact with human users within a conversational or interactive channel. As used herein, a "corpus" may refer to a captured body of source data that can include interactions between various users and virtual agents, wherein the interactions include communications or conversations within one or more suitable types of media (e.g., a help line, a chat room or message string, an email string). As used herein, an "utterance tree" refers to a data structure that stores a representation of the meaning of an utterance. As discussed, an utterance tree has a tree structure (e.g., a dependency parse tree structure) that represents the syntactic structure of the utterance, wherein nodes of the tree structure store vectors (e.g., word vectors, subtree vectors) that encode the semantic meaning of the utterance.

As used herein, an "utterance" refers to a single natural language statement made by a user that may include one or more intents. As such, an utterance may be part of a previously captured corpus of source data, and an utterance may also be a new statement received from a user as part of an interaction with a virtual agent. As used herein, "machine learning" or "ML" may be used to refer to any suitable statistical form of artificial intelligence capable of being trained using machine learning techniques, including supervised, unsupervised, and semi-supervised learning techniques. For example, in certain embodiments, ML-based techniques may be implemented using an artificial neural network (ANN) (e.g., a deep neural network (DNN), a recurrent neural network (RNN), a recursive neural network, a feedforward neural network). In contrast, "rules-based" methods and techniques refer to the use of rule-sets and ontologies (e.g., manually-crafted ontologies, statistically-derived ontologies) that enable precise adjudication of linguistic structure and semantic understanding to derive meaning representations from utterances. As used herein, a "vector" (e.g., a word vector, an intent vector, a subject vector, a subtree vector, a vector representation) refers to a linear algebra vector that is an ordered n-dimensional list (e.g., a 300 dimensional list) of floating point values (e.g., a $1 \times N$ or an $N \times 1$ matrix) that provides a mathematical representation of the semantic meaning of a portion (e.g., a word or phrase, an intent, an entity, a token) of an utterance. As used herein, "domain specificity" refers to how attuned a system is to correctly extracting intents and entities expressed in actual conversations in a given domain and/or conversational channel (e.g., a human resources domain, an information technology domain). As used herein, an "understanding" of an utterance refers to an interpretation or a construction of the utterance by the NLU framework. As such, it may be appreciated that different understandings of an utterance may be associated with different meaning representations having different parse structures (e.g., different nodes, different relationships between nodes), different part-of-speech taggings, and so forth.

With the preceding in mind, the following figures relate to various types of generalized system architectures or configurations that may be employed to provide services to an organization. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may host a management database (e.g., a configuration management database (CMDB)) system and/or other suitable systems. In one embodiment, the client network 12 may be a local private network, such as a local area network (LAN) having a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes an administration or managerial device or server, such as a management, instrumentation, and discovery (MID) server 17 (which may be implemented as hardware, as a virtual server, or as management routines or software) that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary web server installation), an application server (e.g., unitary JAVA Virtual Machine), and/or a database server, e.g., a unitary relational database management system (RDBMS) catalog.

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
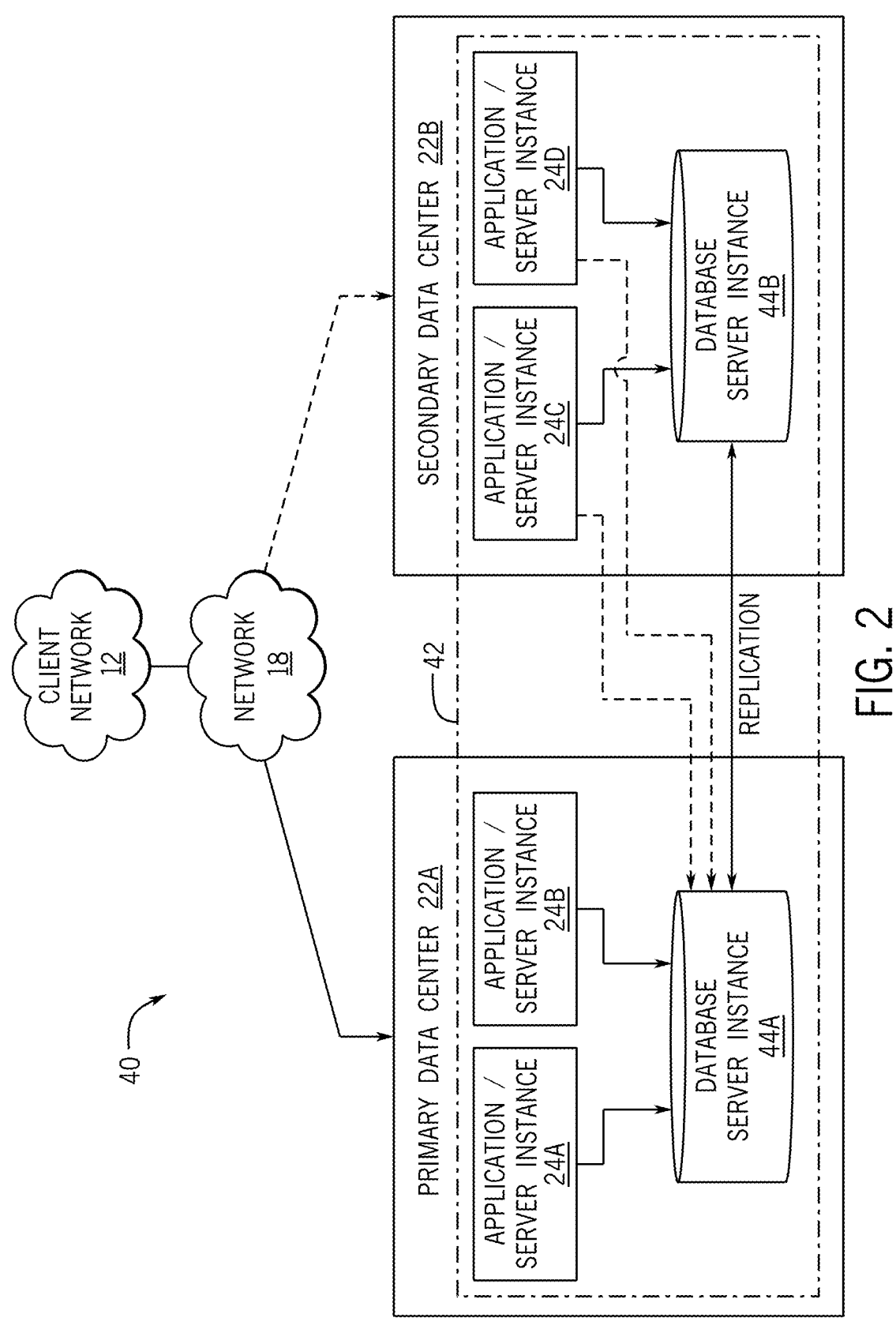
FIG. 2 is a block diagram of an embodiment of a multi-instance cloud architecture in which embodiments of the present technique may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center that includes a primary pair of virtual servers 24A and 24B and the primary virtual database server 44A associated with the client instance 42. Data center 22B acts as a secondary data center 22B to back up the primary data center 22A for the client instance 42. To back up the primary data center 22A for the client instance 42, the secondary data center 22B includes a secondary pair of virtual servers 24C and 24D and a secondary virtual database server 44B. The primary virtual database server 44A is able to replicate data to the secondary virtual database server 44B (e.g., via the network 18).

Having both a primary data center 22A and secondary data center 22B allows data traffic that typically travels to the primary data center 22A for the client instance 42 to be diverted to the secondary data center 22B during a failure and/or maintenance scenario. Using FIG. 2 as an example, if the virtual servers 24A and 24B and/or primary virtual database server instance 44A fails and/or is under maintenance, data traffic for client instances 42 can be diverted to the secondary virtual servers 24C and/or 24D and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers

24A-D and virtual database servers 44A and 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
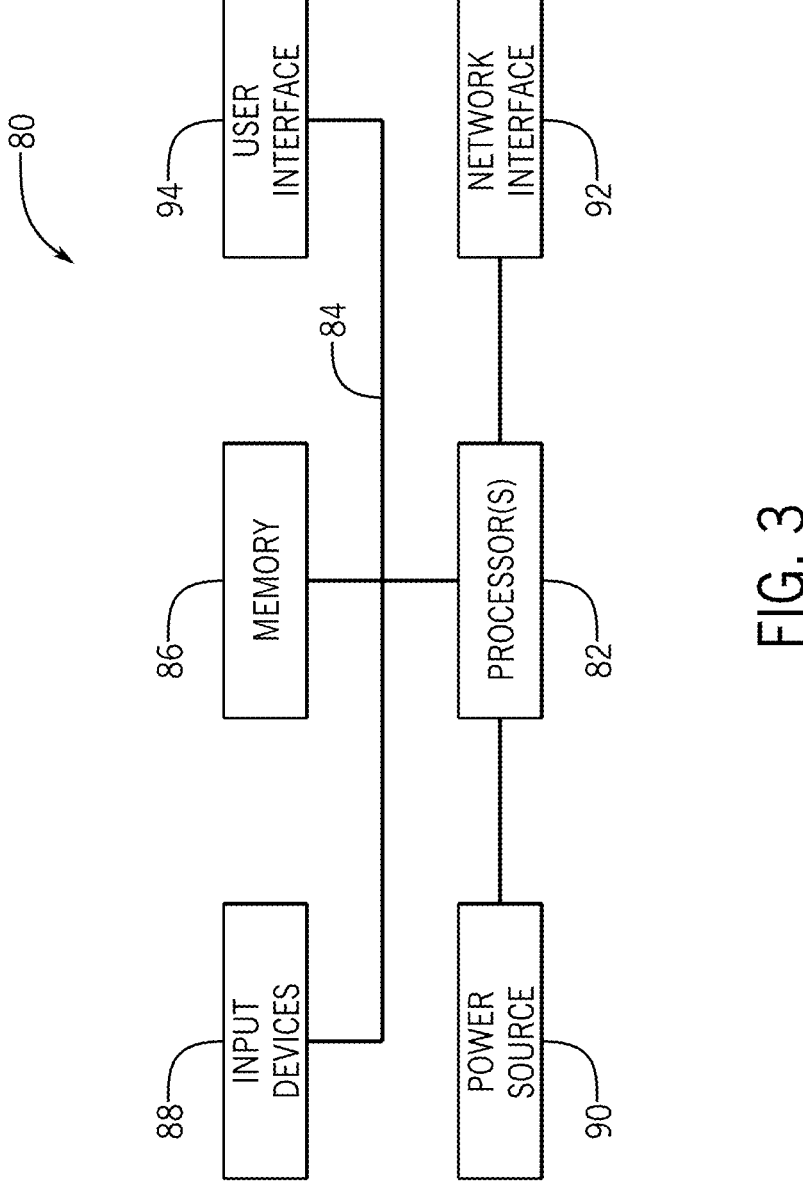
FIG. 3 is a block diagram of a computing device utilized in a computing system that may be present in FIG. 1 or 2, in accordance with aspects of the present technique.

With this in mind, and by way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 include suitable electrical channels to provide data and/or power between the various components of the computing system 80. The memory 86 may include any tangible, non-transitory, and computer-readable storage media. Although shown as a single block in FIG. 3, the memory 86 can be implemented using multiple physical units of the same or different types in one or more physical locations.

The input devices 88 correspond to structures to input data and/or commands to the one or more processors 82. For example, the input devices 88 may include a mouse, touchpad, touchscreen, keyboard and the like. The power source 90 can be any suitable source for power of the various components of the computing system 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

Returning to FIG. 1, it should be appreciated that the cloud-based platform 20 provides an example architecture that may utilize NLU technologies. In particular, the cloud-based platform 20 may include or store a corpus of source data that can be mined, to facilitate the generation of a number of outputs, including an intent/entity model. For example, the cloud-based platform 20 may include ticketing source data having requests for changes or repairs to particular systems, dialog between the requester and a service technician or an administrator attempting to address an issue, a description of how the ticket was eventually resolved, and so forth. Then, the generated intent/entity model can serve as a basis for classifying intents in future requests, and can be used to generate and improve a conversational model to support a virtual agent that can automatically address future issues within the cloud-based platform 20 based on natural language requests from users. As such, in certain embodiments described herein, the disclosed agent automation framework is incorporated into the cloud-based platform 20, while in other embodiments, the agent automation framework may be hosted and executed (separately from the cloud-based platform 20) by a suitable system that is communicatively coupled to the cloud-based platform 20 to process utterances, as discussed below.

Figure 4A:
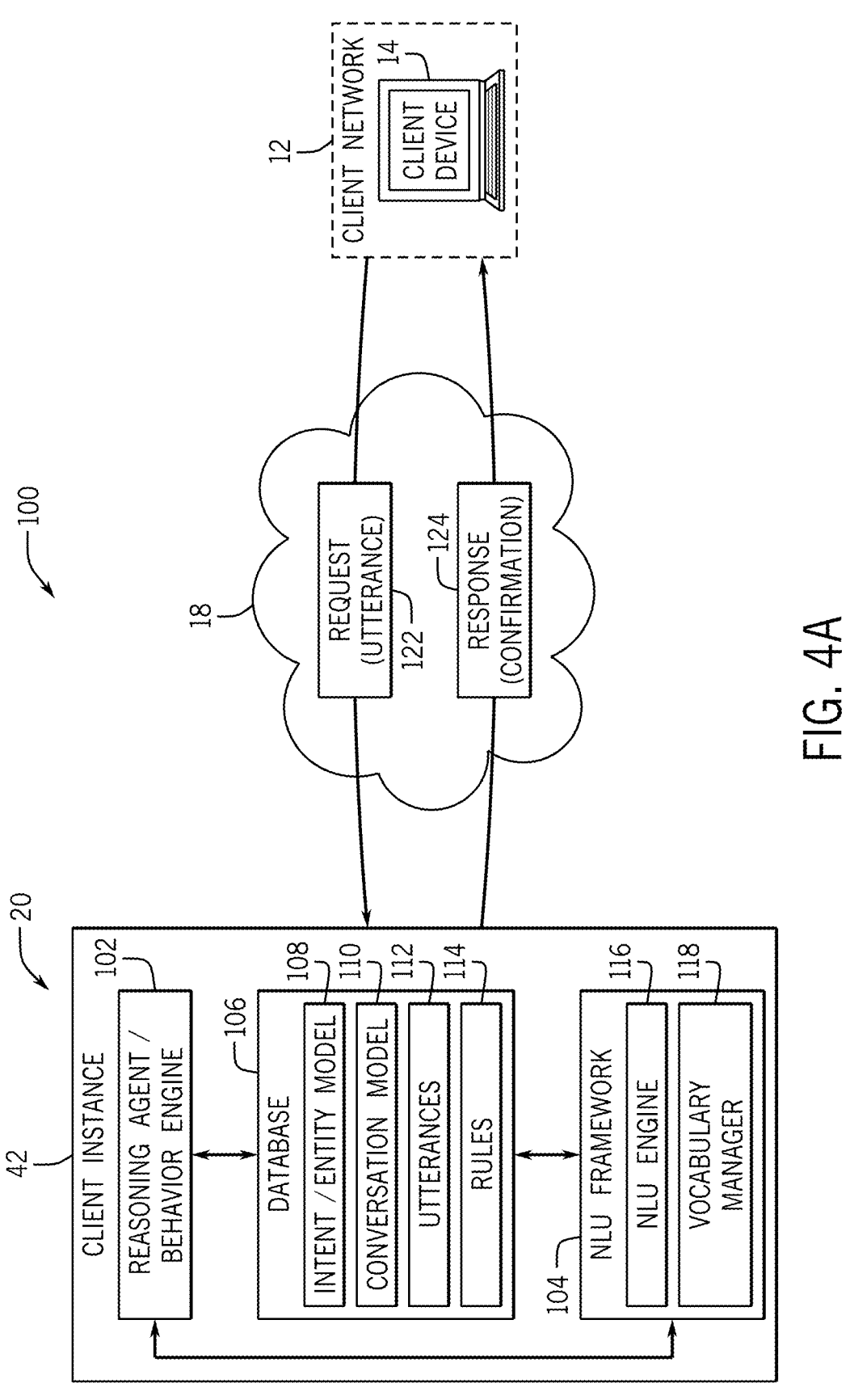
FIG. 4A is a schematic diagram illustrating an embodiment of an agent automation framework including a NLU framework that is part of a client instance hosted by the cloud computing system, in accordance with aspects of the present technique.

With the foregoing in mind, FIG. 4A illustrates an agent automation framework 100 (also referred to herein as an agent automation system 100) associated with a client instance 42, in accordance with embodiments of the present technique. More specifically, FIG. 4A illustrates an example of a portion of a service provider cloud infrastructure, including the cloud-based platform 20 discussed above. The cloud-based platform 20 is connected to a client device 14 via the network 18 to provide a user interface to network applications executing within the client instance 42 (e.g., via a web browser of the client device 14). Client instance 42 is supported by virtual servers similar to those explained with respect to FIG. 2, and is illustrated here to show support for the disclosed functionality described herein within the client instance 42. The cloud provider infrastructure is generally configured to support a plurality of end-user devices, such as client device 14, concurrently, wherein each end-user device is in communication with the single client instance 42. Also, the cloud provider infrastructure may be configured to support any number of client instances, such as client instance 42, concurrently, with each of the instances in communication with one or more end-user devices. As mentioned above, an end-user may also interface with client instance 42 using an application that is executed within a web browser.

The embodiment of the agent automation framework 100 illustrated in FIG. 4A includes a reasoning agent/behavior engine (RA/BE) 102, a NLU framework 104, and a database 106, which are communicatively coupled within the client instance 42. The RA/BE 102 may host or include any suitable number of virtual agents or personas that interact with the user of the client device 14 via natural language user requests 122 (also referred to herein as user utterances 122) and agent responses 124 (also referred to herein as agent utterances 124 or agent confirmations 124). It may be noted that, in actual implementations, the agent automation framework 100 may include a number of other suitable components, including the meaning extraction subsystem, the meaning search subsystem, and so forth, in accordance with the present disclosure.

For the embodiment illustrated in FIG. 4A, the database 106 may be a database server instance (e.g., database server instance 44A or 44B, as discussed with respect to FIG. 2), or a collection of database server instances. The illustrated database 106 stores an intent/entity model 108, a conversation model 110, a corpus of utterances 112, and a collection of rules 114 in one or more tables (e.g., relational database tables) of the database 106. The intent/entity model 108 stores associations or relationships between particular intents and particular sample utterances. In certain embodiments, the intent/entity model 108 may be authored by a designer using a suitable authoring tool. In certain embodiments, the intent/entity model 108 may instead be generated from the corpus of utterances 112. More specifically, the intent/entity model 108 may be generated based on the corpus of utterances 112 and the collection of rules 114 stored in one or more tables of the database 106. It may be appreciated that the corpus of utterances 112 may include source data collected with respect to a particular context, such as chat logs between users and a help desk technician within a particular enterprise, from a particular group of users, communications collected from a particular window of time, and so forth. As such, the corpus of utterances 112 enable the agent automation framework 100 to build an understanding of intents and entities that appropriately correspond with the terminology and diction that may be particular to certain contexts and/or technical fields, as discussed in greater detail below.

For the embodiment illustrated in FIG. 4A, the conversation model 110 stores associations between intents of the intent/entity model 108 and particular responses and/or actions, which generally define the behavior of the RA/BE 102. In certain embodiments, at least a portion of the associations within the conversation model are manually created or predefined by a designer of the RA/BE 102 based on how the designer wants the RA/BE 102 to respond to particular identified intents/entities in processed utterances. It should be noted that, in different embodiments, the database 106 may include other database tables storing other information related to intent classification, such as tables storing information regarding compilation model template data (e.g., class compatibility rules, class-level scoring coefficients, tree-model comparison algorithms, tree substructure vectorization algorithms), meaning representations, and so forth, in accordance with the present disclosure.

For the illustrated embodiment, the NLU framework 104 includes a NLU engine 116 and a vocabulary manager 118 (also referred to herein as a vocabulary subsystem). It may be appreciated that the NLU framework 104 may include any suitable number of other components. In certain embodiments, the NLU engine 116 is designed to perform a number of functions of the NLU framework 104, including generating word vectors (e.g., intent vectors, subject or entity vectors, subtree vectors) from word or phrases of utterances, as well as determining distances (e.g., Euclidean distances) between these vectors. For example, the NLU engine 116 is generally capable of producing a respective intent vector for each intent of an analyzed utterance. As such, a similarity measure or distance between two different utterances can be calculated using the respective intent vectors produced by the NLU engine 116 for the two intents, wherein the similarity measure provides an indication of similarity in meaning between the two intents.

The vocabulary manager 118, which may be part of the vocabulary subsystem discussed below, addresses out-of-vocabulary words and symbols that were not encountered by the NLU framework 104 during vocabulary training. For example, in certain embodiments, the vocabulary manager 118 can identify and replace synonyms and domain-specific meanings of words and acronyms within utterances analyzed by the agent automation framework 100 (e.g., based on the collection of rules 114), which can improve the performance of the NLU framework 104 to properly identify intents and entities within context-specific utterances. Additionally, to accommodate the tendency of natural language to adopt new usages for pre-existing words, in certain embodiments, the vocabulary manager 118 handles repurposing of words previously associated with other intents or entities based on a change in context. For example, the vocabulary manager 118 could handle a situation in which, in the context of utterances from a particular client instance and/or conversation channel, the word "bike" actually refers to a motorcycle rather than a bicycle.

Once the intent/entity model 108 and the conversation model 110 have been created, the agent automation framework 100 is designed to receive a user utterance 122 (in the form of a natural language request) and to appropriately take action to address the request. For example, for the embodiment illustrated in FIG. 4A, the RA/BE 102 is a virtual agent that receives, via the network 18, the utterance 122 (e.g., a natural language request in a chat communication) submitted by the client device 14 disposed on the client network 12. The RA/BE 102 provides the utterance 122 to the NLU framework 104, and the NLU engine 116, along with the various subsystems of the NLU framework 104 discussed below, processes the utterance 122 based on the intent/entity model 108 to derive intents/entities within the utterance 122. Based on the intents/entities derived by the NLU engine 116, as well as the associations within the conversation model 110, the RA/BE 102 performs one or more particular predefined actions. For the illustrated embodiment, the RA/BE 102 also provides a response 124 (e.g., a virtual agent utterance or confirmation) to the client device 14 via the network 18, for example, indicating actions performed by the RA/BE 102 in response to the received user utterance 122. Additionally, in certain embodiments, the utterance 122 may be added to the utterances 112 stored in the database 106 for continued learning within the NLU framework 104, as discussed below.

It may be appreciated that, in other embodiments, one or more components of the agent automation framework 100 and/or the NLU framework 104 may be otherwise arranged, situated, or hosted for improved performance. For example, in certain embodiments, one or more portions of the NLU framework 104 may be hosted by an instance (e.g., a shared instance, an enterprise instance) that is separate from, and communicatively coupled to, the client instance 42. It is presently recognized that such embodiments can advantageously reduce the computational resources allocated to or utilized by the client instance 42, improving the efficiency of the cloud-based platform 20. In particular, in certain embodiments, one or more components of the semantic mining framework discussed below may be hosted by a separate instance (e.g., an enterprise instance) that is communicatively coupled to the client instance 42, as well as other client instances, to enable semantic intent mining and generation of the intent/entity model 108.

Figure 4B:
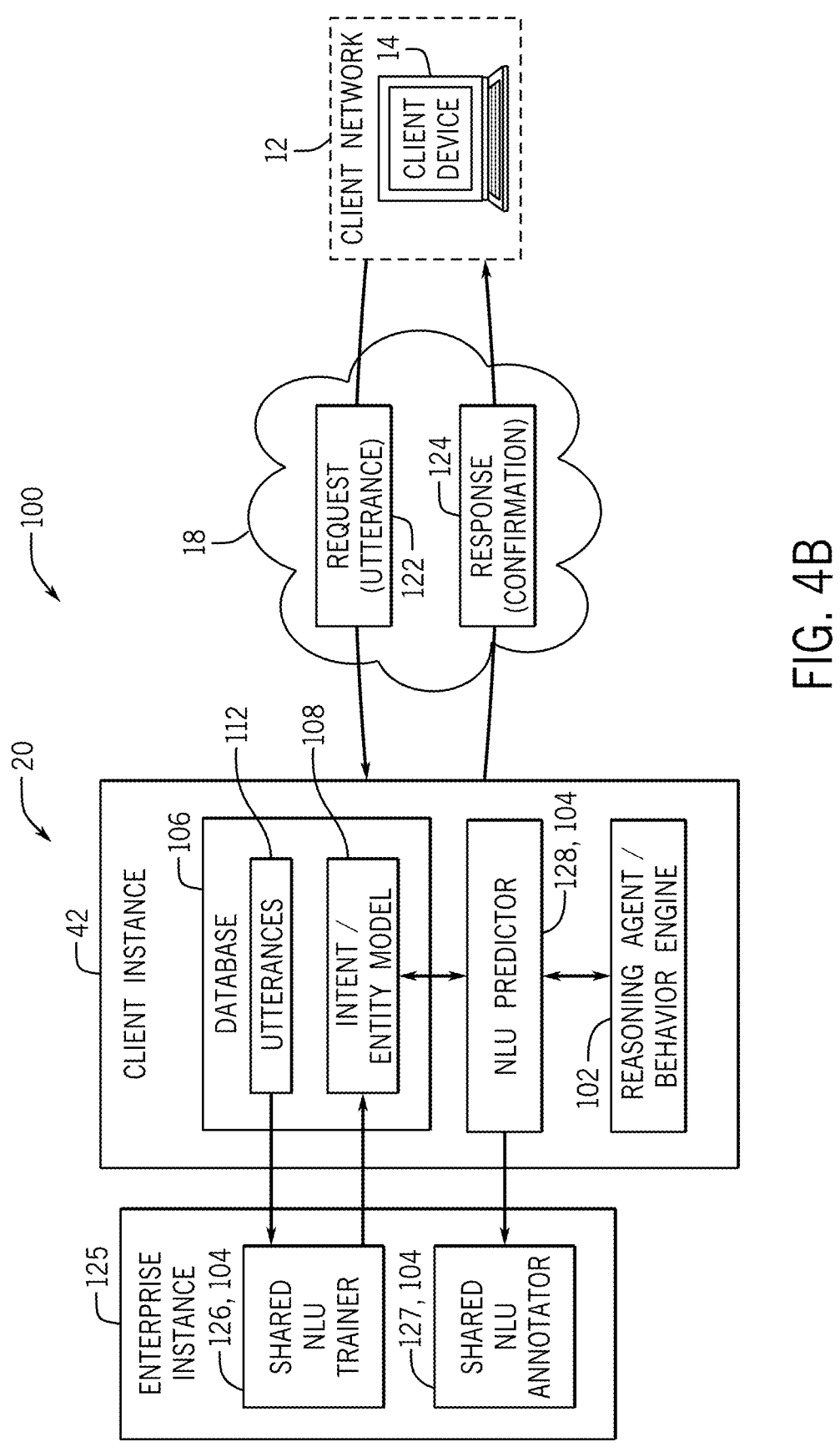
FIG. 4B is a schematic diagram illustrating an alternative embodiment of the agent automation framework in which portions of the NLU framework are part of an enterprise instance hosted by the cloud computing system, in accordance with aspects of the present technique.

With the foregoing in mind, FIG. 4B illustrates an alternative embodiment of the agent automation framework 100 in which portions of the NLU framework 104 are instead executed by a separate, shared instance (e.g., enterprise instance 125) that is hosted by the cloud-based platform system 20. The illustrated enterprise instance 125 is communicatively coupled to exchange data related to intent/entity mining and classification with any suitable number of client instances via a suitable protocol (e.g., via suitable Representational State Transfer (REST) requests/responses). As such, for the design illustrated in FIG. 4B, by hosting a portion of the NLU framework 104 as a shared resource accessible to multiple client instances 42, the size of the client instance 42 can be substantially reduced (e.g., compared to the embodiment of the agent automation framework 100 illustrated in FIG. 4A) and the overall efficiency of the agent automation framework 100 can be improved.

In particular, the NLU framework 104 illustrated in FIG. 4B is divided into three distinct components that perform different aspects of semantic mining and intent classification within the NLU framework 104. These components include: a shared NLU trainer 126 hosted by the enterprise instance 125, a shared NLU annotator 127 hosted by the enterprise instance 125, and a NLU predictor 128 hosted by the client instance 42. It may be appreciated that the organizations illustrated in FIGS. 4A and 4B are merely examples, and in other embodiments, other organizations of the NLU framework 104 and/or the agent automation framework 100 may be used, in accordance with the present disclosure.

For the embodiment of the agent automation framework 100 illustrated in FIG. 4B, the shared NLU trainer 126 is designed to receive the corpus of utterances 112 from the client instance 42, and to perform semantic mining (e.g., including semantic parsing, grammar engineering, and so forth) to facilitate generation of the intent/entity model 108. Once the intent/entity model 108 has been generated, when the RA/BE 102 receives the user utterance 122 provided by the client device 14, the NLU predictor 128 passes the utterance 122 and the intent/entity model 108 to the shared NLU annotator 127 for parsing and annotation of the utterance 122. The shared NLU annotator 127 performs semantic parsing, grammar engineering, and so forth, of the utterance 122 based on the intent/entity model 108 and returns annotated utterance trees of the utterance 122 to the NLU predictor 128 of client instance 42. The NLU predictor 128 then uses these annotated structures of the utterance 122 to identify matching intents from the intent/entity model 108, such that the RA/BE 102 can perform one or more actions based on the identified intents. It may be appreciated that the shared NLU annotator 127 may correspond to the meaning extraction subsystem, and the NLU predictor 128 may correspond to the meaning search subsystem, of the NLU framework 104.

Figure 5:
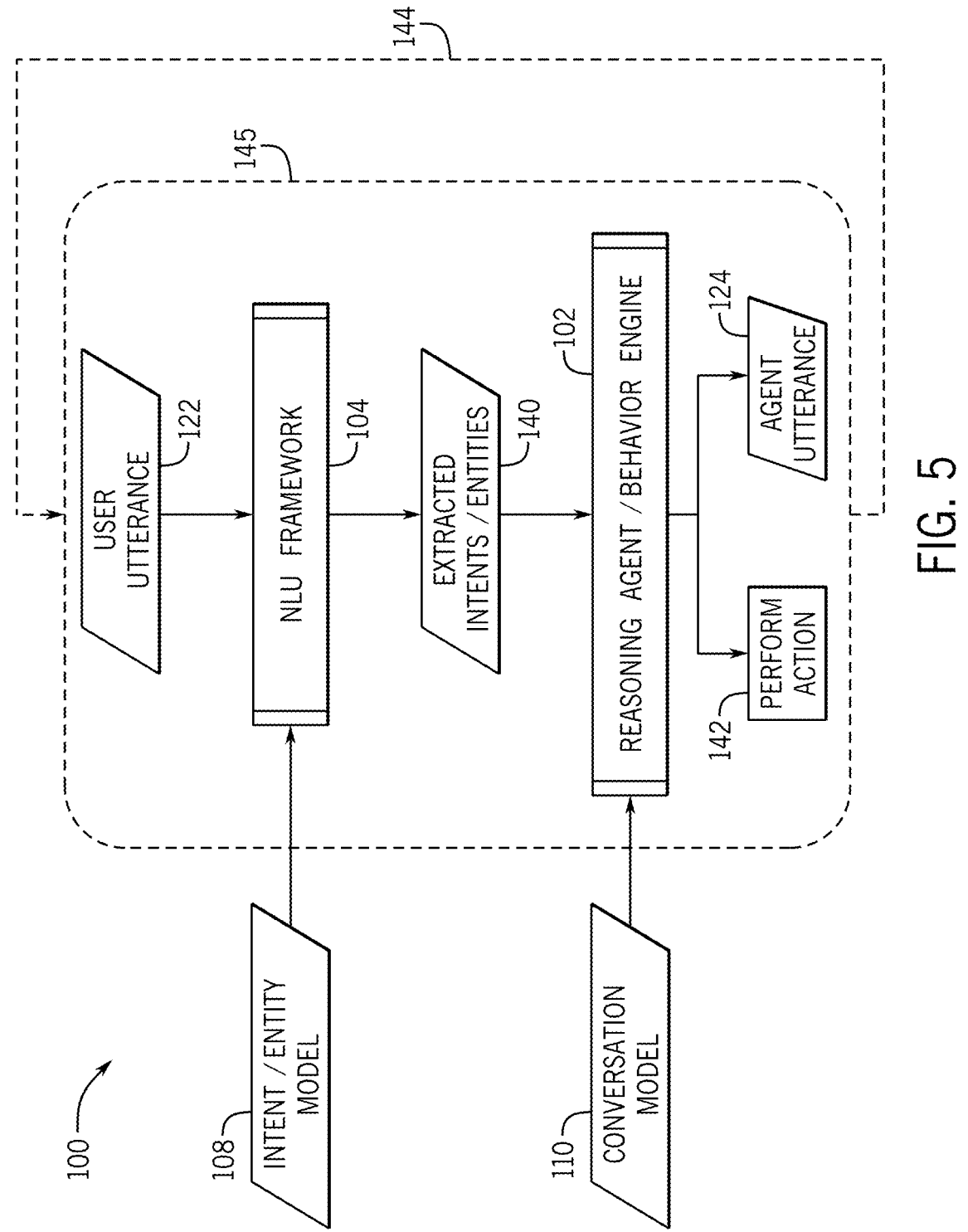
FIG. 5 is a flow diagram illustrating an embodiment of a process by which an agent automation framework, including an NLU framework and a Reasoning Agent/Behavior Engine (RA/BE) framework, extracts intent/entities from and responds to a user utterance, in accordance with aspects of the present technique.

FIG. 5 is a flow diagram depicting the roles of the reasoning agent/behavior engine (RA/BE) 102 and NLU framework 104 within an embodiment of the agent automation framework 100. For the illustrated embodiment, the NLU framework 104 processes a received user utterance 122 to extract intents/entities 140 based on the intent/entity model 108. The extracted intents/entities 140 may be implemented as a collection of symbols that represent intents and entities of the user utterance 122 in a form that is consumable by the RA/BE 102. As such, these extracted intents/entities 140 are provided to the RA/BE 102, which processes the received intents/entities 140 based on the conversation model 110 to determine suitable actions 142 (e.g., changing a password, creating a record, purchasing an item, closing an account) and/or virtual agent utterances 124 in response to the received user utterance 122. As indicated by the arrow 144, the process 145 can continuously repeat as the agent automation framework 100 receives and addresses additional user utterances 122 from the same user and/or other users in a conversational format. As illustrated in FIG. 5, it may be appreciated that, in certain situations, no further action or communications may occur once the suitable actions 142 have been performed.

It should be noted that, while the user utterance 122 and the agent utterance 124 are discussed herein as being conveyed using a written conversational medium or channel (e.g., chat, email, ticketing system, text messages, forum posts), in other embodiments, voice-to-text and/or text-to-voice modules or plugins could be included to translate spoken user utterance 122 into text and/or translate text-based agent utterance 124 into speech to enable a voice interactive system, in accordance with the present disclosure. Furthermore, in certain embodiments, both the user utterance 122 and the virtual agent utterance 124 may be stored in the database 106 (e.g., in the corpus of utterances 112) to enable continued learning of new structure and vocabulary within the agent automation framework 100. In some embodiments, the user utterance 122 and the virtual agent utterance 124 may be stored in a cache to improve system performance. As mentioned previously, caching may reduce computing resource utilization, improve performance, and reduce costs associated with responding to queries, as discussed in greater detail below.

Figure 6:
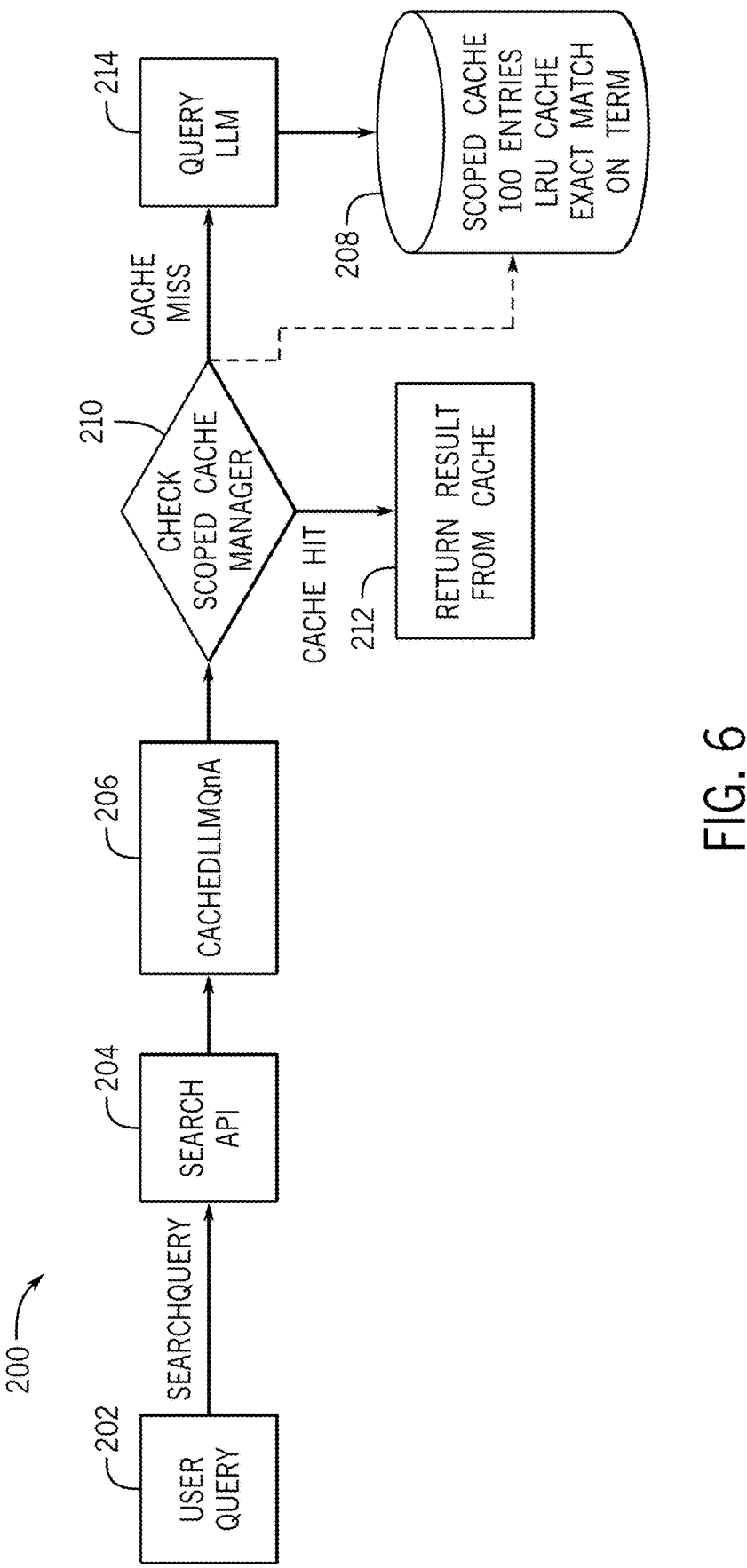
FIG. 6 is a block diagram illustrating an embodiment of a querying process implementing a cache, in accordance with aspects of the present technique.

FIG. 6 is a block diagram showing an embodiment of a querying process 200 implementing a cache to store user inputs (e.g., user utterance 122) and responses to the user inputs (e.g., the virtual agent utterance 124). At block 202, a user query (e.g., user utterance 122) may be received or generated at the client device 14. At block 204, the user query may be input into a user interface of a network application (e.g., a large language model (LLM)) executing within the client instance 42 (e.g., via a web browser of the client device 14). At block 206, a cache 208 that is used to store data for the network application may be identified (e.g., a cache used to store questions and answers for LLM) by the client device 14 and/or the client instance 42. The cache 208 may include a list of "key-value" pairs stored in memory for fast access to the data of the network application. Each cache entry of the cache 208 may include a "key-value" pair. The "key" of a "key-value" pair may include a search query and is a unique lookup entity for which a single "value" is stored in the cache 208. In some embodiments, the "key" may also include other information related to the search query, such as references, context information, etc. The "value" (cached value) of the "key-value" pair may include corresponding answer or result generated by the network application for the search query included in the "key". Accordingly, the cache 208 may store "key-value" pairs associated with the network application for previous queries. The historical data stored in the cache 208 may be used for quick access to repeated queries having the same "keys".

In some embodiments, the cache 208 may be stored locally in the client network 12 (e.g., on the client device

14), which may reduce the time it takes for the client device 14 to retrieve data from the cache 208. In some embodiments, the cache 208 may be stored in the cloud-based platform 20 (e.g., the data centers 22A and 22B, the client instance 42, the enterprise instance 125), which may reduce the time it takes to update the cache entries of the cache 208 using the data generated by the network application. The cache 208 may be managed by a cache manager that controls the operations of the cache storage, such as cache eviction, cache updates, etc. Various policies may be used for the cache management, such as the least recently used (LRU) eviction policy, the first in first out (FIFO) eviction policy, and so forth. Although in the illustrated embodiment of FIG. 6, the cache 208 may use LRU eviction policy, other policies (e.g., the FIFO eviction policy) may be used in other embodiments.

At block 210, the search queries in the "keys" of the cache entries of the cache 208 may be compared with the user query. A cache hit occurs when a matching "key" that includes the user query is found in the cache 208, while a cache miss occurs when no matching "key" is found in the cache 208. Since a given input to the network application returns the same cache key and results in the same cached value, caching may enable reusing previously generated results (e.g., the virtual agent utterance 124) of the network application without going through the querying process (e.g., meaning extraction and meaning search process, such as the process 145), thereby providing search results faster and expending fewer computing resources. When a cache hit occurs for the user query, at block 212, the "value" of the matching "key" may be retrieved from the cache 208 and returned as a result for the user query. When a cache miss occurs for the user query, at block 214, the user query may be sent to the network application (e.g., to generate a response via the LLM), which may be executed using the user query to obtain a result for the user query. The result may be used to add a cache entry to the cache 208.

However, if the user query is slightly different (e.g., different order of words, different choice of words, different verb tense, etc.) than any of the search queries in the "keys" of the cache entries of the cache 208, even when some of the search queries may have the same or similar meanings as the user query, a cache miss may occur at block 210 causing an execution of the network application to obtain a result for the user query (e.g., the LLM), which may cause a delay in responding to the user query, result in consuming more computing resources and increasing operating cost, and the like. This may occur often for user generated inputs, such as plaintext queries. For example, different users may use different choice of words or different order of words for the queries, and even for the same user, different queries with different words or different order of words may be used for the same query purpose. To obtain search results faster and expend fewer computing resources, semantic matching may be used to retrieve data for the user query from the cache entries including queries with the same or similar meanings as the user query, as described in greater detail bellow.

Figure 7:
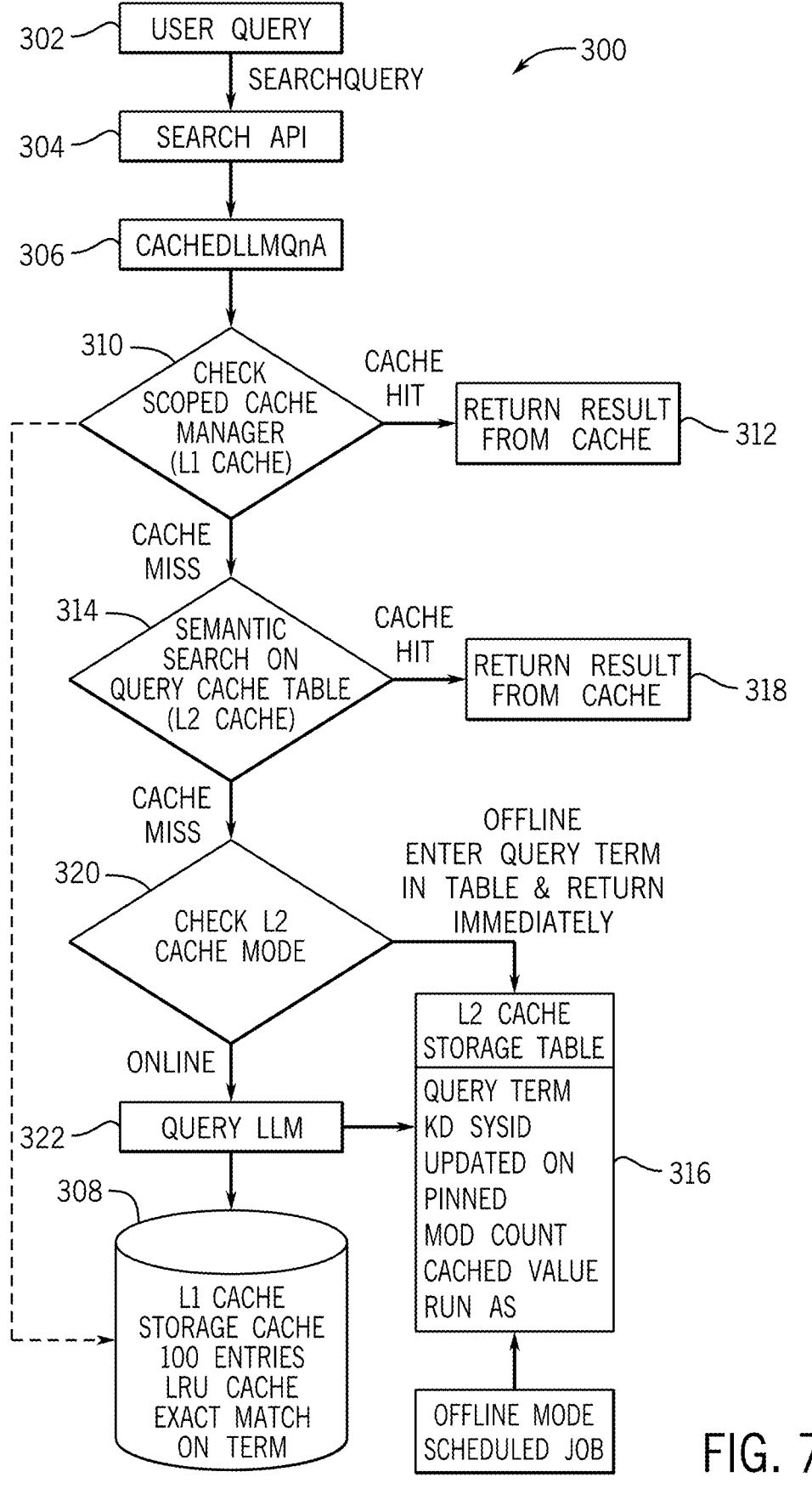
FIG. 7 is a block diagram illustrating another embodiment of a querying process implementing a cache utilizing semantic matching to retrieve data from a cache for a user input, in accordance with aspects of the present technique.

FIG. 7 is a block diagram showing another embodiment of a querying process 300 utilizing semantic matching to retrieve data from a cache for a user input. At block 302, a user query (e.g., user utterance 122) may be received or generated at the client device 14. At block 304, the user query may be input into a user interface of a network application executing within the client instance 42 (e.g., via a web browser of the client device 14). At block 306, a cache that is used to store data for the network application may be identified (e.g., a cache used to store questions and answers generated by the LLM) by the client device 14 and/or the client instance 42. The cache may include a first-level cache 308 including a list of "key-value" pairs stored in memory for fast access to the data of the network application. Similar as the cache 208 described above, each cache entry of the first-level cache 308 may include a "key-value" pair. The "key" of a "key-value" pair may include a search query and is a unique lookup entity for which a single "value" is stored in the first-level cache 308. In some embodiments, the "key" may also include other information related to the search query, such as references, context information, etc. The "value" of the "key-value" pair may include corresponding answer or result generated by the network application for responding to the search query included in the "key". Accordingly, the first-level cache 308 may store "key-value" pairs associated with the network application for previous queries. The historical data stored in the first-level cache 308 may be used for quick access to repeated queries having the same "keys".

In some embodiments, the first-level cache 308 may be stored locally in the client network 12 (e.g., on the client device 14), which may reduce the time it takes for the client device 14 to retrieve data from the first-level cache 308. In some embodiments, the first-level cache 308 may be stored in the cloud-based platform 20 (e.g., the data centers 22A and 22B, the client instance 42, the enterprise instance 125), which may reduce the time it takes to update the cache entries of the first-level cache 308 using the data generated by the network application. The first-level cache 308 may be managed by a cache manager that controls the operations of the cache storage, such as cache eviction, cache update, etc. Various policies may be used for the cache management, such as the least recently used (LRU) eviction policy, the first in first out (FIFO) eviction policy, and so forth. Although in the illustrated embodiment of FIG. 7, the cache 308 may use LRU eviction policy, other policies (e.g., the FIFO eviction policy) may be used in other embodiments.

At block 310, the search queries in the "keys" of the cache entries of the first-level cache 308 may be compared with the user query. A cache hit occurs when a matching "key" that includes the user query is found in the first-level cache 308, while a cache miss occurs when no matching "key" is found in the first-level cache 308. Since a given input to the network application returns the same cache key and results in the same cached value, caching may enable reusing previously generated results (e.g., the virtual agent utterance 124) of the network application without going through the querying process (e.g., meaning extraction and meaning search process, such as the process 145), thereby providing search results faster and expending fewer computing resources.

When a cache hit occurs for the user query, at block 312, the "value" of the matching "key" may be retrieved from the first-level cache 308 and returned as a result for the user query. When a cache miss occurs for the user query, a semantic search may be performed at block 314 on a second-level cache 316. The second-level cache 316 may include a storage table, which may be used as an AI search indexed source. Each record of the table is a cache entry, which may include a search query (e.g., "query term"), information related to the search query (e.g., associated knowledge article search result ("KB SysID")), update status (e.g., "updated on"), status (e.g., "pinned"), a cached value, etc., as illustrated in FIG. 7. By using semantic search on the second-level cache 316, the system of the current disclosure increases the likelihood of obtaining data from the cache as it does not require an exact match of an input to successfully identify an entry in the cache, thereby providing search results faster and expending fewer computing resources. In addition, using an AI search indexed storage table to store search queries and corresponding cached values in the cache improves search efficiency of the semantic search.

The cached value in a record may include a corresponding answer or result generated by the LLM for the search query in the same record. For example, the search query (e.g., the user utterance 122) may be submitted by a client device (e.g., the client device 14) and received by the NLU framework 104 (e.g., the NLU engine 116, the vocabulary manager 118, as illustrated in FIG. 4A and FIG. 4B). The NLU framework 104 may process the search query based on the intent/entity model 108 and the conversation model 110 to derive the semantic meaning (e.g., intents/entities and associations between intents) of the search query. Based on the derived semantic meaning of the search query, the RA/BE 102 may determine an answer or result (e.g., the virtual agent utterances 124) in response to the search query, as illustrated in FIG. 5. The answer or result of the search query may be stored as the cached value of the corresponding record that includes the search query. The semantic meaning of the user query may be compared with the corresponding semantic meaning of the search query for each record of the table in the second-level cache. For instance, a respective semantic value may be determined for the search query of each record based on the semantic meaning of the search query, and the semantic value of the user query may be compared with the semantic values of the search queries in the records. A respective match score may then be determined for each record based on a comparison of the semantic value of the respective search query and the semantic value of the user query. A matching record may be identified when the match score of the record is greater than a threshold value. For example, vectors (e.g., word vectors, intent vectors, subject vectors, subtree vectors, vector representations) may be generated (e.g., by the NLU engine 116 as described with reference to FIG. 4A) and used to encode the semantic meanings of queries (e.g., stored in an "utterance tree"). As used herein, a "vector" (e.g., a word vector, an intent vector, a subject vector, a subtree vector, a vector representation) refers to a linear algebra vector that is an ordered n-dimensional list (e.g., a 300 dimensional list) of floating point values (e.g., a $1 \times N$ or an $N \times 1$ matrix) that provides a mathematical representation of the semantic meaning of a portion (e.g., a word or phrase, an intent, an entity, a token) of an utterance. Accordingly, comparing the semantic meanings of queries may include comparing corresponding vectors in the n-dimensional vector space. Many techniques may be used to compare two vectors in the vector space, such as nearest neighbor method, cosine similarity method, etc. For example, the nearest neighbor method measures the distance between two vectors in the vector space, the smaller the distance the more similar the two vectors are. The cosine similarity method measures the cosine of the angle between the two vectors and may be used to indicate the similarity between two vectors. Both methods may be used as a similarity measure to calculate a match score. ML models may be trained to capture the semantic similarity between queries and used for semantic search.

When a match score is greater than a threshold value, the corresponding record may be identified as a matching record, and a cache hit occurs. When a cache hit occurs for the second-level cache 316, the corresponding cached value of the matching record may be retrieved from the second-level cache 316 and returned as a result for the user query at block 318. In some embodiments, when a cache hit occurs, a certain operation (e.g., an "updateLazy" operation indicating updating priority) may be triggered for the second-level cache 316 indicating a lower priority to query the database (e.g., via a LLM) to update the second-level cache 316, as the result of the user query is already retrieved from the second-level cache 316. This results in reduced computing resource utilization, improved system performance, and reduced costs associated with responding to queries.

When a matching record is not found in the second-level cache 316, a cache miss occurs. Then the cache mode of the second-level cache 316 may be checked at block 320. The second-level cache 316 may have multiple cache modes, such as offline, online, etc. When the second-level cache 316 is in an online mode, the cache miss may trigger an operation to send the user query to the LLM via the network application at block 322, and the network application may be executed using the user query to obtain a result for the user query. The result obtained from the LLM by the network application at block 322 may be used to populate or update the first-level cache 308 and the storage table in the second-level cache 316. When the second-level cache 316 is in an offline mode (e.g., default mode), the cache miss may trigger an operation to add an entry including the user query in the storage table of the second-level cache 316, and this entry may be added to a list of scheduled jobs. In addition, a response may be returned indicating the second-level cache 316 is offline. The list of scheduled jobs may be cleaned up by executing the network application routinely, or on demand, or as scheduled, and the results obtained from the LLM by the network application may be used to populate/update the second-level cache 316. In addition, the second-level cache 316 may be updated manually or automatically. The second-level cache 316 may be managed by a cache manager that controls the operations of the cache storage, such as cache eviction, cache update, etc. Various policies may be used for the cache management, such as the least recently used (LRU) eviction policy, the first in first out (FIFO) eviction policy. For example, cache entries of the second-level cache 316 may be automatically purged based on changes/updates to the related information in the cache entries (e.g., KB SysID), or cleaned up based on update status (e.g., updated on) when the number of cache entries in the second-level cache 316 is over a threshold. Some records may be pinned (e.g., when a criteria is satisfied), manually or automatically, so that the records may stay in the second-level cache 316 without being cleaned up. An additional semantic search may be performed for the user query after the scheduled jobs are completed and/or the second-level cache 316 is updated. By using different cache modes (e.g., online, offline) for the second-level cache 316, querying (e.g., via the LLM) may be more efficiently managed. For example, when the second-level cache 316 is in the offline mode, queries may be added to the list of scheduled jobs and executed based on priorities of the queries (e.g., indicated by the clients or in certain categories), priorities of the clients, or a consideration of both.

Figure 8:
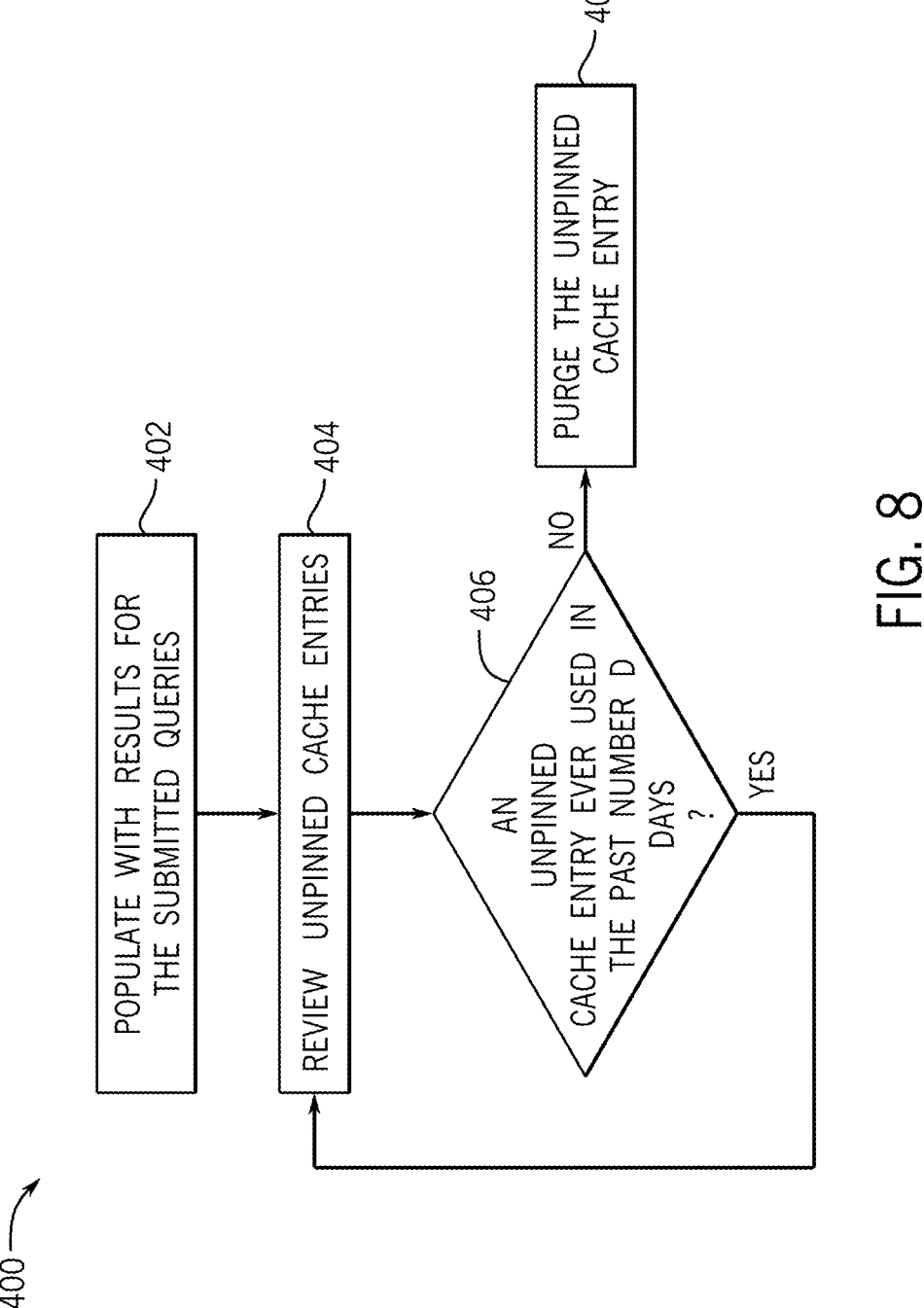
FIG. 8 is a flow diagram illustrating a process for updating the cache used in FIG. 7, in accordance with aspects of the present technique.

FIG. 8 illustrates a flow diagram of a process 400 for updating the second-level cache 316. The second-level cache 316 may be updated routinely (e.g., daily, when an output is generated by the LLM, when a threshold number of outputs have been generated by the LLM, etc.), or on demand (e.g., when the number of jobs in the list of scheduled jobs is more than a certain number), or as scheduled (e.g., by a user of the client device 14 or an administrator of the platform 20). At block 402, the second-level cache 316 may be populated with the results obtained by the network application for the queries submitted when the second-level cache 316 is in an online mode and/or the queries included in the list of scheduled jobs when the second-level cache 316 is in an offline mode. In some embodiments, the second-level cache 316 may be populated with the most frequently submitted queries, which may be stored in a search signal table. At block 404, each unpinned cache entry in the second-level cache 316 may be reviewed. At block 406, the visiting frequency of an unpinned cache entry may be determined. For example, if the unpinned cache entry has been used in the past number D (e.g., D=7) of days, the unpinned cache entry may be kept in the second-level cache 316, and block 404 and block 406 may be repeated for other unpinned cache entries. If the unpinned cache entry has not been used in the past number D (e.g., D=7) of days, the unpinned cache entry may be purged from the second-level cache 316

In some embodiments, the second-level cache 316 may be stored locally in the client network 12 (e.g., on the client device 14), which may reduce the time it takes for the client device 14 to retrieve data from the second-level cache 316. In some embodiments, the second-level cache 316 may be stored in the cloud-based platform 20 (e.g., the data centers 22A and 22B, the client instance 42, the enterprise instance 125), which may reduce the time it takes to update the cache entries of the second-level cache 316 using the data generated by the network application. In addition, the second-level cache 316 may include cache entries generated for other client instances (e.g., other than the client instance 42 that is coupled to the client device 14). For example, the second-level cache 316 may be stored in the enterprise instance 125 or communicatively coupled to the enterprise instance 125 so that the second-level cache 316 may store cache entries generated for the client instances associated with the enterprise instance 125. In some embodiments, the second-level cache 316 may include cache entries being in the cache for a relative longer time period (e.g., days) since the cache entries are generated than the first-level cache 308. Accordingly, the second-level cache 316 may include cache entries different from the cache entries in the first-level cache 308 (e.g., different users from different client instances may use different choice of words or different order of words for the queries). In some embodiments, content security restrictions may be applied to the first-level cache 308 and/or the second-level cache 316. For example, a user may not receive a response to a query if the user has no access to the information or references associated with the response. In some embodiments, the records in the second-level cache 316 may be used to populate/update the first-level cache 308. It should be noted that, in some embodiments, the first-level cache 308 and the second-level cache 316 may be completely independent. In addition, in some embodiments, the second-level cache 316 may be by-passed and only the first-level cache 308 may be used for the querying process.

Technical effects of this section of the present disclosure include using semantic matching to retrieve data from a cache memory. In some implementations, the system includes a two-tiered cache system, with a first tier implementing key-value pairs and a second tier including a table that is configured as an artificial intelligence (AI) search indexed source. In these implementations, when a new input does not have a key match at the first tier, the system may perform a semantic search at the second tier of the cache to determine if relevant data is stored in the cache. Accordingly, the current disclosure may increase the likelihood of obtaining data from the cache memory as it does not require an exact match of an input to successfully identify an entry in the cache. In addition, average response time may be reduced for the system of the current disclosure since queried data may be processed by retrieving the queried data from the cache, rather than querying the database (e.g., via a LLM), which may also reduce computing resource utilization, improve system performance, and reduce costs associated with responding to queries. Moreover, search consistency may be improved by returning the same result for similar queries.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method comprising:
receiving, via processing circuitry, a query from a client device;
determining that the query does not match any record of a first plurality of records stored in a first cache, wherein a first set of policies is used for managing the first cache;
in response to determining that the query does not match any record of the first plurality of records,
determining a semantic value of the query; and
identifying, within a second plurality of records stored in a second cache, a particular record comprising a particular query term corresponding to a particular semantic value that matches the semantic value of the query within an error threshold, wherein a second set of policies is used for managing the second cache, and wherein the second set of policies comprises a different update policy, a different eviction policy, or both, compared to the first set of policies.

2. The method of claim 1, wherein each record of the first plurality of records comprises a respective cache key corresponding to a respective cache value, wherein the respective cache key comprises a respective query term and the respective cache value corresponds to a respective unique identifier used to identify a respective result for the respective query term.

3. The method of claim 2, wherein determining that the query does not match any of the first plurality of records comprises:
comparing the query with the respective query terms of the first plurality of records; and
identifying that none of the first plurality of records comprises a query term that matches the query.

4. The method of claim 1, wherein each record of the second plurality of records comprises a respective cache key corresponding to a respective cache value, wherein the respective cache key comprises a respective query term and the respective cache value corresponds to a respective unique identifier used to identify a respective result for the respective query term.

5. The method of claim 4, wherein identifying the particular record comprises,
determining a respective match score for each record of the second plurality of records based on a comparison of a respective semantic value of the respective query term and the semantic value of the query;
identifying a matching record from the second plurality of records having a match score that satisfies a threshold match score; and
providing, in response to the query, a cached value of the particular record.

6. The method of claim 1, wherein the semantic value of the query is determined based on an intent of the query, and the particular semantic value is determined based on a particular intent of the particular query term.

7. The method of claim 6, wherein determining the intent of the query comprises generating a semantic word vector for the query.

8. The method of claim 1, comprising:
receiving an additional query; and
in response to an additional record corresponding to the additional query not being found in either the first plurality of records or the second plurality of records, determining a response for the additional query based on data stored in a database.

9. The method of claim 8, wherein the determining the response for the additional query comprises:
providing the additional query to a large language model (LLM);
receiving an output from the LLM based on the data stored in the database; and
providing the output in response to the additional query.

10. The method of claim 1, wherein the second cache comprises a data index table comprising a plurality of data entries for storing the second plurality of records.

11. A system comprising:
processing circuitry; and
memory accessible by the processing circuitry, the memory storing
instructions that, when executed by the processing circuitry, cause the processing circuitry to perform operations comprising:
receiving a query from a client device;
determining that the query does not match any record of a first plurality of records stored in a first cache, wherein a first set of policies is used for managing the first cache;
in response to determining that the query does not match any record of the first plurality of records, determining a semantic value of the query; and
identifying, within a second plurality of records stored in a second cache, a particular record comprising a particular query term corresponding to a particular semantic value that matches the semantic value of the query within an error threshold, wherein a second set of policies is used for managing the second cache, and wherein the second set of policies comprises a different update policy, a different eviction policy, or both, compared to the first set of policies.

12. The system of claim 11, wherein each record of the first plurality of records comprises a respective cache key corresponding to a respective cache value, wherein the respective cache key comprises a respective query term and the respective cache value corresponds to a respective unique identifier used to identify a respective result for the respective query term.

13. The system of claim 11, wherein each record of the second plurality of records comprises a respective cache key corresponding to a respective cache value, wherein the respective cache key comprises a respective query term and the respective cache value corresponds to a respective unique identifier used to identify a respective result for the respective query term.

14. The system of claim 11, wherein the first cache is stored in a local network.

15. The system of claim 11, wherein the second cache is stored in a data center.

16. A tangible, non-transitory computer readable storage media storing instructions that, when executed by processing circuitry, cause the processing circuitry to perform operations comprising:

receiving a query from a client device;

determining that the query does not match any record of a first plurality of records stored in a first cache, wherein a first set of policies is used for managing the first cache;

in response to determining that the query does not match any record of the first plurality of records, determining a semantic value of the query; and identifying, within a second plurality of records stored in a second cache, a particular record comprising a particular query term corresponding to a particular semantic value that matches the semantic value of the query within an error threshold, wherein a second set of policies is used for managing the second cache, and wherein the second set of policies comprises a different update policy, a different eviction policy, or both, compared to the first set of policies.

17. The non-transitory computer readable storage media of claim 16, wherein each record of the first plurality of records comprises a respective cache key corresponding to a respective cache value, wherein the respective cache key comprises a respective query term and the respective cache value corresponds to a respective unique identifier used to identify a respective result for the respective query term.

18. The non-transitory computer readable storage media of claim 16, wherein each record of the second plurality of records comprises a respective cache key corresponding to a respective cache value, wherein the respective cache key comprises a respective query term and the respective cache value corresponds to a respective unique identifier used to identify a respective result for the respective query term.

19. The method of claim 8, further comprising:

in response to the additional record corresponding to the additional query not being found in either the first plurality of records or the second plurality of records, updating the first cache to include a record comprising the response.

20. The system of claim 11, wherein the first plurality of records is stored in the first cache for a first time period based on the first set of policies, and wherein the second plurality of records is stored in the second cache for a second time period based on the second set of policies, and wherein the second time period is longer than the first time period.

* * * * *